United States Patent
Kulkarni

(10) Patent No.: US 11,287,057 B2
(45) Date of Patent: Mar. 29, 2022

(54) Y-GLOBE VALVE ASSEMBLY WITH INTEGRATED PRESSURE RELIEF PASSAGEWAY

(71) Applicant: MCC Holdings, Inc., The Woodlands, TX (US)

(72) Inventor: Sudhir K. Kulkarni, Cincinnati, OH (US)

(73) Assignee: Crane ChemPharma & Energy Corp., The Woodlands, TX (US)

(*) Notice: Subject to any disclaimer, the term of this patent is extended or adjusted under 35 U.S.C. 154(b) by 107 days.

(21) Appl. No.: 16/571,903

(22) Filed: Sep. 16, 2019

(65) Prior Publication Data
US 2020/0088319 A1    Mar. 19, 2020

Related U.S. Application Data

(60) Provisional application No. 62/732,376, filed on Sep. 17, 2018.

(51) Int. Cl.
*F16K 39/02* (2006.01)
*F16K 15/06* (2006.01)

(52) U.S. Cl.
CPC .............. *F16K 39/02* (2013.01); *F16K 15/06* (2013.01)

(58) Field of Classification Search
CPC ..... F16K 1/10; F16K 1/36; F16K 1/42; F16K 1/48; F16K 3/246; F16K 3/267; F16K 15/06; F16K 15/18; F16K 27/0209; F16K 27/041; F16K 31/50; F16K 39/022; F16K 1/02; F16K 1/50; F16K 3/24; F16K 39/02
See application file for complete search history.

(56) References Cited

U.S. PATENT DOCUMENTS

| 1,383,005 | A |   | 6/1921  | Mertens   |             |
|-----------|---|---|---------|-----------|-------------|
| 1,890,836 | A | * | 12/1932 | Webb      | F16K 31/508 |
|           |   |   |         |           | 251/266     |
| 2,097,698 | A | * | 11/1937 | Mohr      | F16K 15/18  |
|           |   |   |         |           | 251/225     |
| 2,685,426 | A | * | 8/1954  | MacGregor | F16K 1/10   |
|           |   |   |         |           | 251/118     |
| 3,992,729 | A |   | 9/1976  | Pool et al. |           |
| 3,979,105 | A |   | 11/1976 | Mills     |             |
| 4,171,791 | A |   | 10/1979 | Bass      |             |
| 4,199,850 | A |   | 4/1980  | Velan     |             |
| 4,279,906 | A |   | 7/1981  | Eguchi    |             |
| 4,421,298 | A |   | 12/1983 | Kujawski  |             |
| 4,688,757 | A |   | 8/1987  | Cook et al. |           |
| 5,456,285 | A |   | 10/1995 | Lee       |             |
| 6,761,183 | B1|   | 7/2004  | Hoeptner, III |         |

FOREIGN PATENT DOCUMENTS

| DE |   576771 C    | * | 5/1933 | ............ F16K 15/18 |
|----|---------------|---|--------|-------------------------|
| GB | 191312445 A   | * | 5/1914 | ............... F16K 1/02 |

* cited by examiner

*Primary Examiner* — Hailey K. Do

(57) ABSTRACT

A Y-globe valve assembly includes a valve body having a neck portion defining a chamber with a circumferential wall and an integrated pressure relief passageway formed in the circumferential wall and communicating between the chamber and a flow passageway downstream of a valve port. A valve includes a core having an outer surface spaced radially inwardly from the circumferential wall of the valve body so as to define an annular space therebetween. The pressure relief passageway is in fluid communication between the annular space and the flow passageway upstream of the valve port when the valve is in at least the open position.

15 Claims, 5 Drawing Sheets

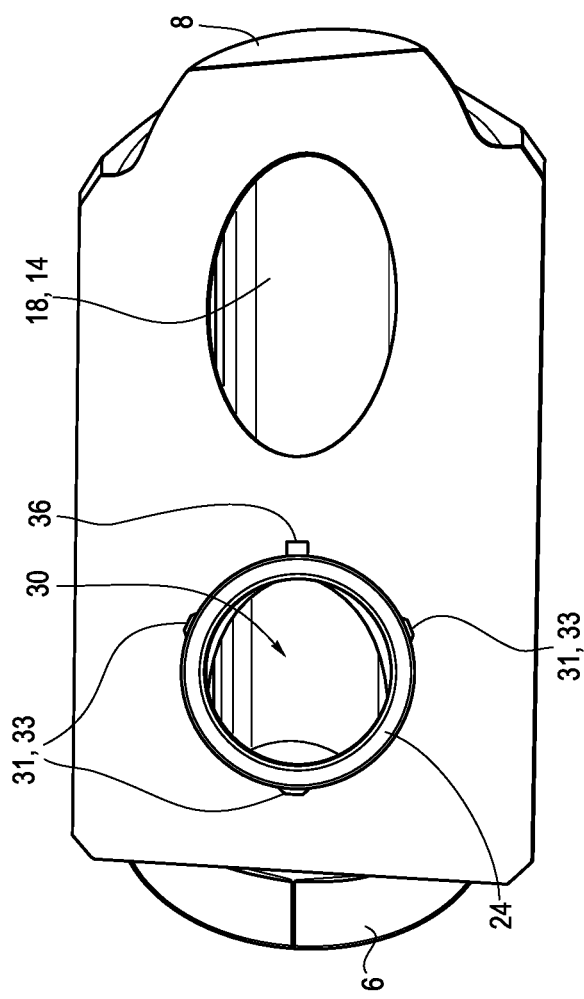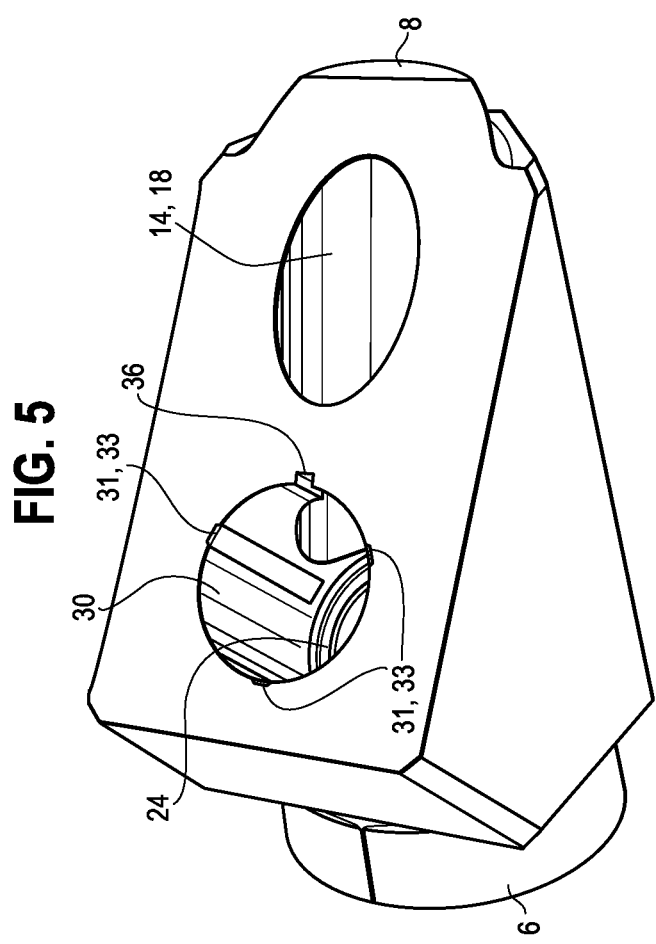

Y-GLOBE VALVE ASSEMBLY WITH INTEGRATED PRESSURE RELIEF PASSAGEWAY

This application claims the benefit of U.S. Provisional Application 62/732,376, filed Sep. 17, 2018, the entire disclosure of which is hereby incorporated herein by reference.

FIELD OF THE INVENTION

The present disclosure relates generally to a valve, and in particular to a Y-globe stop check valve assembly having an integrated pressure relief passageway.

BACKGROUND

Y-globe valve assemblies have a body generally configured in the shape of a "Y," which allows for a relative flat bottom. The flow passageway in such valves is typically relatively straight, which may help minimize clogging and corrosion. Moreover, the Y-globe valve assemblies typically have a relatively low pressure drop. In some instances, the valve moving within the valve body may trap a fluid (e.g., steam) as the valve head moves to an open position. The trapped fluid may be at a different pressure than the pressure of the fluid in the flow passageway. To provide pressure relief, external pressure relief pipes may be required to communicate between the two regions. Such exterior pipes typically have high installation costs, require periodic inspection and maintenance, and are more susceptible to damage due to their exposure.

SUMMARY

The present invention is defined by the following claims, and nothing in this section should be considered to be a limitation on those claims.

In one aspect, one embodiment of a Y-globe valve assembly includes a valve body with an inlet portion having an inlet port, and an outlet portion having an outlet port. The inlet and outlet portions define a flow passageway between the inlet port and the outlet port. The inlet and outlet ports are aligned along a first axis. The valve body further includes a valve port separating the inlet and outlet portions. The valve port is configured with a valve seat. A neck portion extends upwardly from one of the inlet or outlet portions along a second axis forming an acute angle with the first axis. The neck portion defines a chamber having a circumferential wall and an upper end. An integrated pressure relief passageway is formed in the circumferential wall and communicates between the chamber and the flow passageway downstream of the valve port.

In one embodiment, a valve includes a core having an outer surface spaced radially inwardly from the circumferential wall of the valve body. The outer surface and the surface of the circumferential wall define an annular space therebetween. Upper and lower guides extend radially from the core and engage the circumferential wall of the chamber. The upper and lower guides are spaced apart on the core along the second axis and define a top and bottom of the annular space. A valve head is disposed below the lower guide. The valve is moveable between an open position, wherein the valve head is spaced apart from the valve seat, and a closed position, wherein the valve head is engaged with the valve seat. The pressure relief passageway is in fluid communication between the annular space and the flow passageway downstream of the valve port when the valve is in at least the open position.

In another aspect, a method of using a Y-globe valve assembly includes moving the valve between a closed position, wherein the valve head is engaged with the valve seat, and an open position, wherein the valve head is spaced apart from the valve seat. The method includes passing a fluid from the annular space through the pressure relief passageway and into the flow passageway downstream of the valve port when the valve is moved to the open position.

The various embodiments of the valve body and valve, and the methods for the use thereof, provide significant advantages over other valve bodies, valves and methods of use. For example and without limitation, the disclosed valve body allows for pressure relief and transfer of fluids trapped in the annular space between the outer surface of the valve core and the interior surface of the circumferential wall of the valve body. The interior passageway is formed integrally, which may be done quickly and inexpensively, for example by machining the valve body. The passageway avoids the need to install an exterior pipe, which may be susceptible to leakage and is exposed, leading to a heightened risk of damage. At the same time, the need for routine inspections and maintenance of any exterior piping is avoided.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 5 is an isometric cross-sectional view of the valve body take along line 5-5 of FIG. 4.

FIG. 6 is a cross-sectional view of the valve body take along line 6-6 of FIG. 4.

DETAILED DESCRIPTION OF THE PRESENTLY PREFERRED EMBODIMENTS

Figure 1:
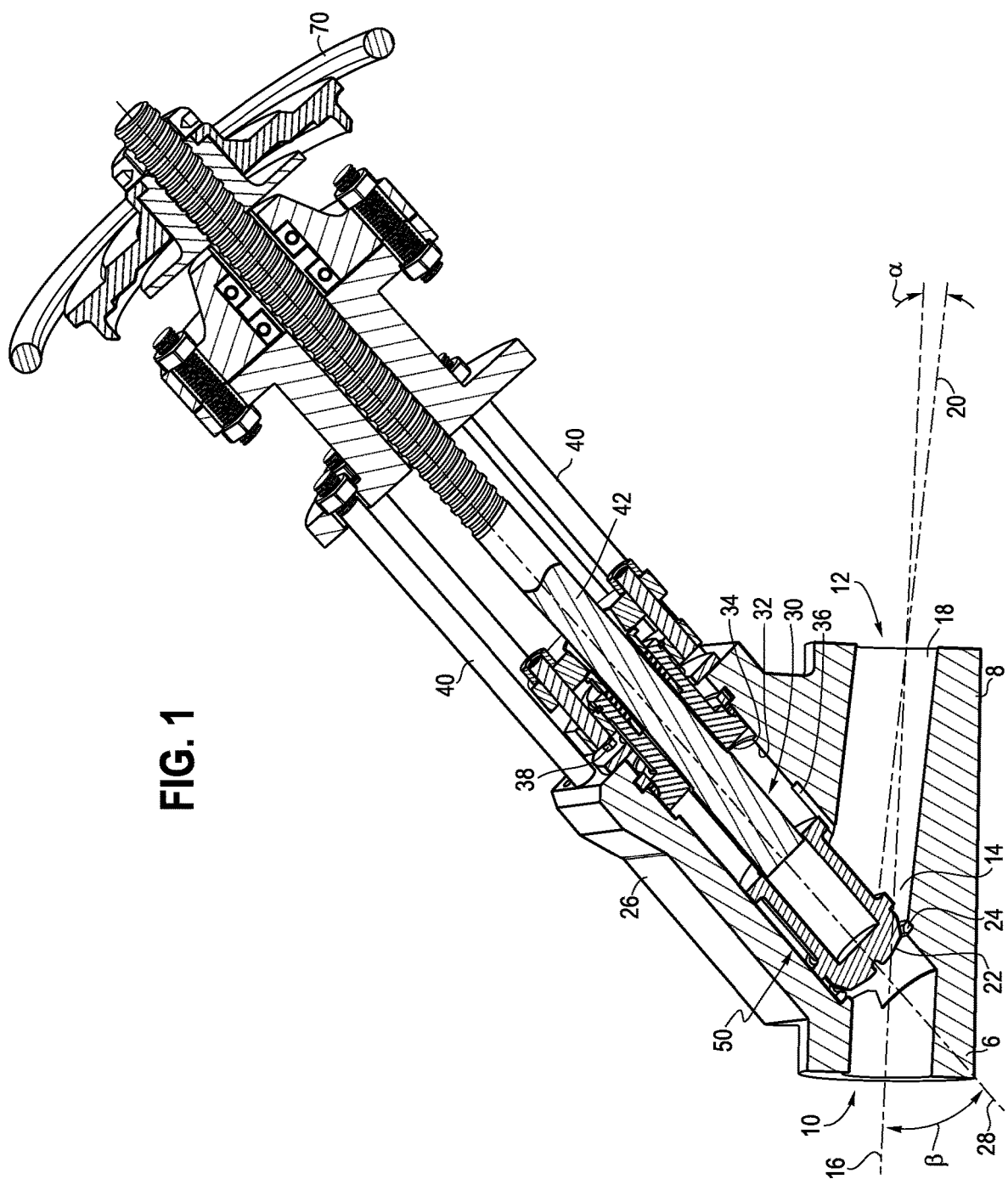
FIG. 1 is a cross-sectional view of one embodiment of a Y-globe valve assembly with a valve in a closed position.

It should be understood that the term "plurality," as used herein, means two or more. The terms "outboard" and "inboard" refer to the relative position of different features relative to a common axis or plane. The term "coupled" means connected to or engaged with, whether directly or indirectly, for example with an intervening member, and does not require the engagement to be fixed or permanent, although it may be fixed or permanent (or integral). The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" axis may be later referred to as a "second" axis depending on the order in which they are referred. It should also be understood that designation of "first" and "second" does not necessarily mean that the two components or values so designated are different, meaning for example a first axis may be the same as a second axis, with each simply being applicable to separate components. The terms "vertical" and "horizontal" refer to the orientation of various components as shown in the drawings, but with the understanding that those components may be rotated and used in other orientations. The terms "upstream" and "downstream" refer to the flow direction, with the term "upstream" referring to the direction towards the source of the flow, the input port or against the direction of flow, while the term "downstream" refers to the direction away from the source of the flow, i.e., the output port or in the direction of flow. The term "fluid" refers to any gas or liquid, including steam.

Valve Body:

Referring to FIGS. 1, 2 and 4-7, a valve body 2 includes an inlet portion 6 having an inlet port 10 and an outlet portion 8 having an outlet port 12. The inlet and outlet portions define a flow passageway 14 between the inlet port and the outlet port. As shown in FIG. 1, the inlet and outlet ports are coaxially aligned along a longitudinal axis 16, although the passageway 14 may not be linear. In one embodiment, the portion 18 of the passageway 14 defined along the outlet portion has an inclined trajectory along an axis 20 defining an angle α relative to the axis 16. The inlet and outlet ports 10, 12 have a diameter of between and including 7.76 inches and 13.16 inches in one embodiment, with the passageway 14 having a cross-sectional area of between and including 47.29 sq. inches and 136.02 sq. inches in one embodiment, although it should be understood that other diameters and cross-sectional areas may be suitable. It should be understood that the diameters, or cross sectional areas, of the inlet and outlet ports and the flow passageway may be different or vary relative to each other. A valve port 22 separates the inlet and outlet portions. The valve port includes a valve seat 24 configured with a seat ring, which may be formed from ASTM A 182 F91. The seating surface may be hard faced, including for example and without limitation a Stellite® hard facing.

The valve body 2 includes a neck portion 26 extending upwardly from one of the inlet or outlet portions 6, 8 along an axis 28, which forms an acute angle ß with the axis 16. The neck is inclined or angled in the downstream direction, or toward the outlet port. The neck portion includes a chamber 30 defined by an interior surface of a circumferential wall 32 and an upper end, which is closed by a bonnet 34 having a backseat. The chamber 30 has a diameter of between and including 8.94 inches and 14.58 inches in one embodiment, although it should be understood that other diameters may be suitable. Although the chamber 30 is cylindrical in one embodiment, it should be understood that the chamber may have other cross-sectional shapes.

An integrated pressure relief passageway 36 is integrally formed in the circumferential wall and is in fluid communication with, and communicates between, the chamber 30 and the flow passageway 14 downstream of the valve port 22. The terms "integrated" or "integrally formed" refer to the relief passageway 36 being formed in the valve body, e.g. by machining, rather than being defined by a separate piece or pipe coupled to the valve body, for example by welding and/or mechanical connection. In one embodiment, the relief passageway 36 is formed as an elongated channel or slot extending radially outwardly from the inner surface of the circumferential wall 32 into the wall itself. In the embodiment of FIG. 1, the relief passageway 36 extends only partially along the length of the circumferential wall 32, while in the embodiment of FIG. 7, the relief passageway 36 extends along the entirety of the length of the wall 32. The relief passageway 36 may have a cross-sectional area of between and including 0.5 sq. inches and 1.0 sq. inches, and is 0.60 square inches in one embodiment, although other cross-sectional areas may be suitable. In one embodiment, as shown in FIG. 6, the relief passageway 36 has a rectangular cross-sectional area, although it should be understood that it may have other shapes, including various polygonal shapes, a semi-circular shape, or other suitable shapes defining a channel.

As shown in FIGS. 5 and 6, additional grooves 31 may extend longitudinally along the circumferential wall 32 defining the chamber 30. The grooves 31 are machined into the wall 32, filled by hard facing welding material 33, and machined again to provide a smooth and continuous cylindrical surface of the circumferential wall 34. The hard facing material 33 provides a wear resistant surface interfacing with the valve guides 58, 60 (or discs) as explained in more detail hereinafter.

The valve body may be made of various suitable materials, including steel (e.g., carbon steel, chrome steel or stainless steel). The relief passageway is machined into the circumferential wall.

Valve Components

Figure 2:
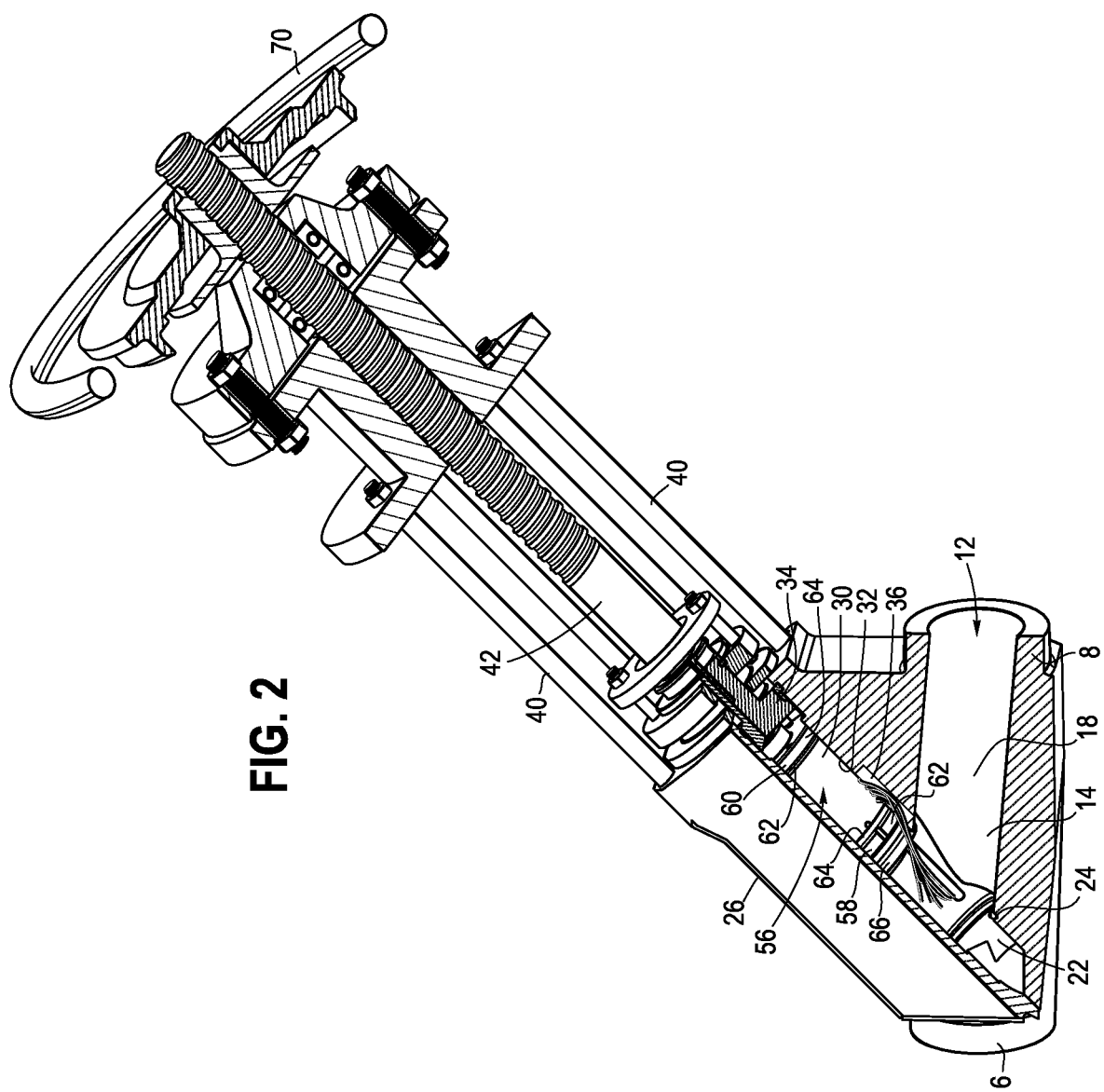
FIG. 2 is a cross-sectional view of one embodiment of a Y-globe valve assembly with a valve in an open position.
Figure 4:
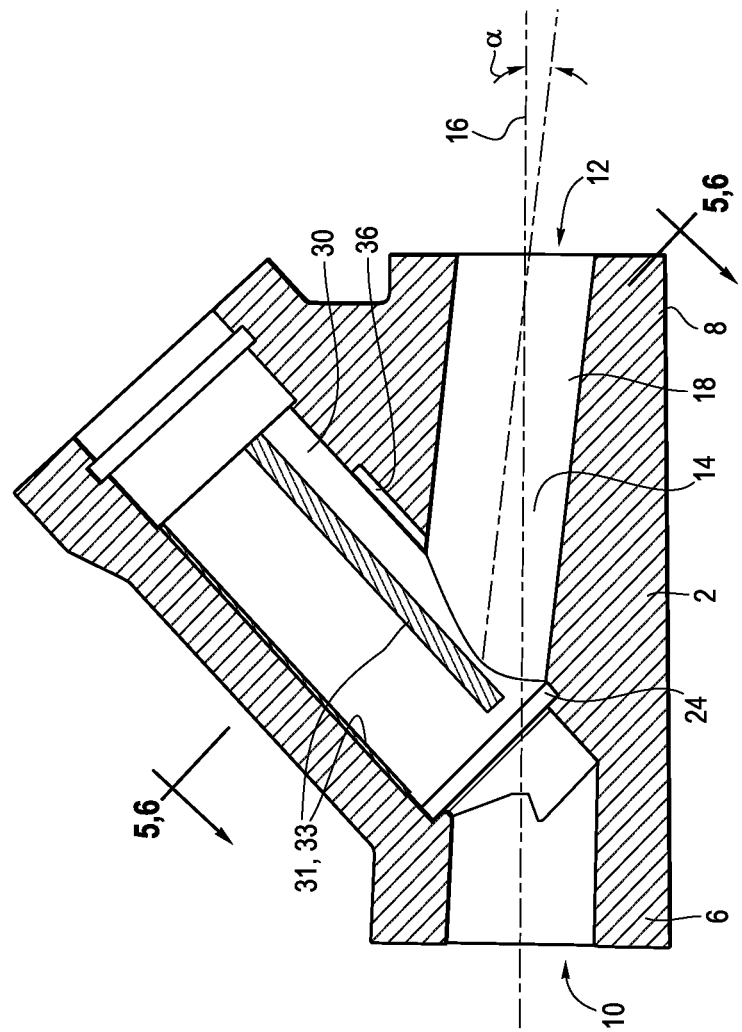
FIG. 4 is a cross-sectional view of the valve body.
Figure 3:
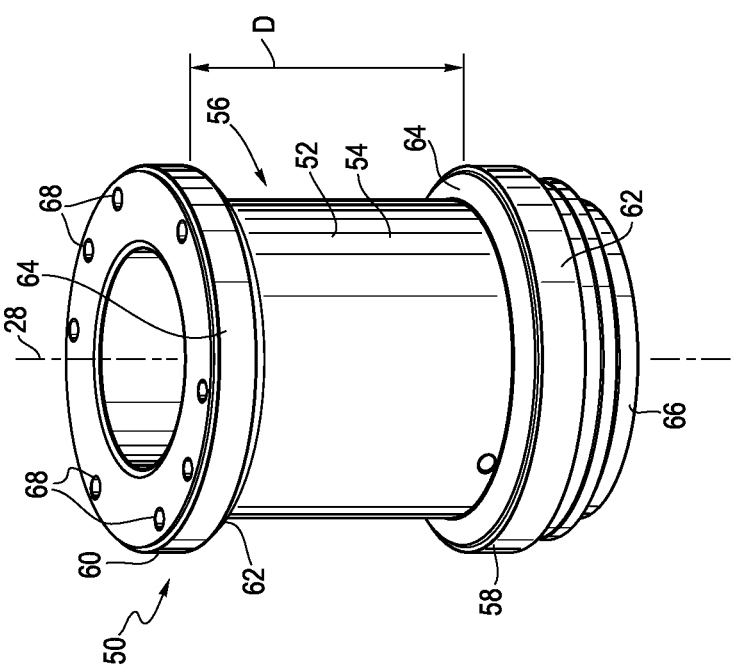
FIG. 3 is a perspective view of one embodiment of a valve.
Figure 7:
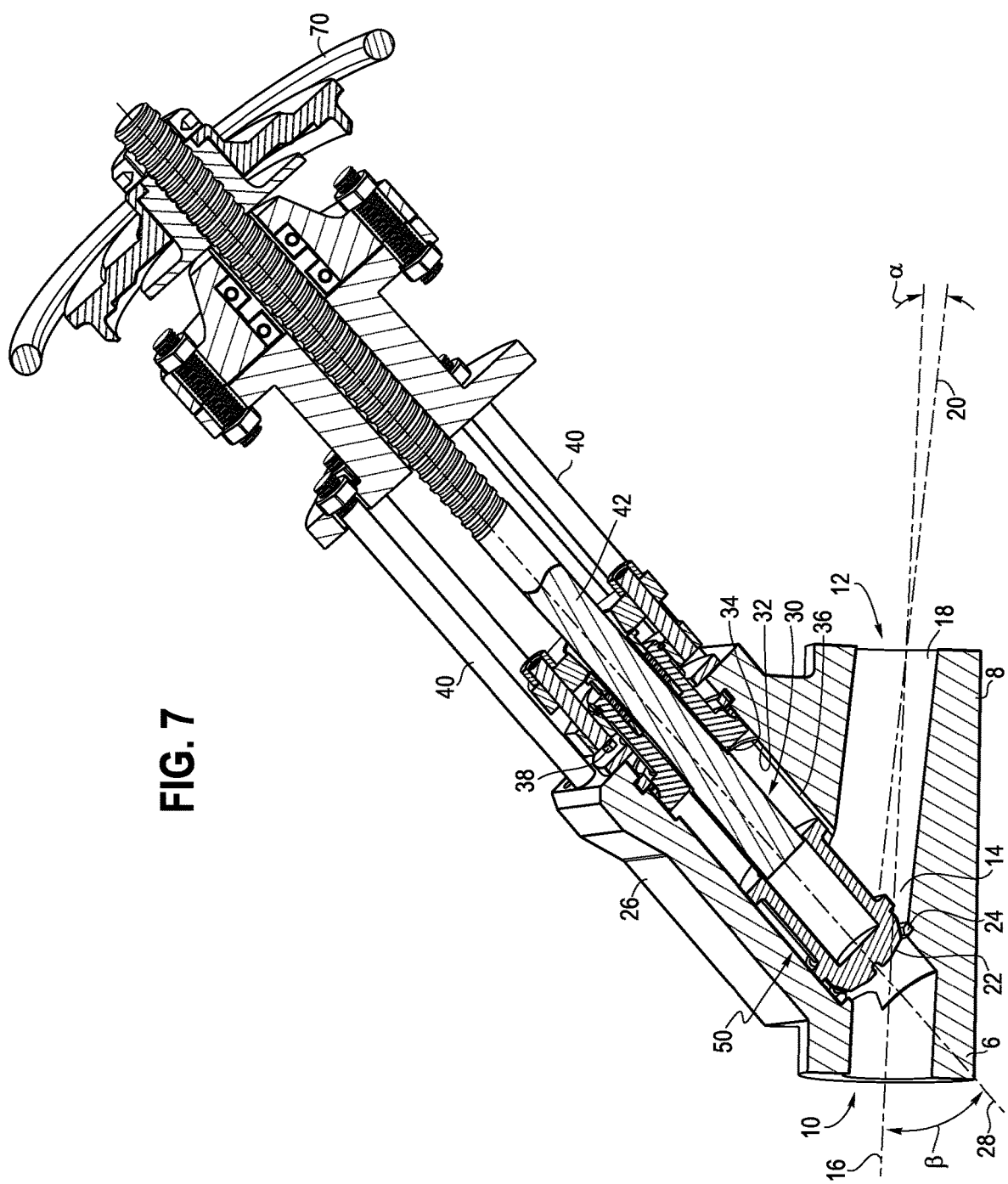
FIG. 7 is a cross-sectional view of another embodiment of a Y-globe valve assembly with a valve in a closed position.

Referring to FIGS. 1, 2 and 7, the bonnet 34 is secured to the top of the valve body with a plurality of fasteners 38 to close the open end of the chamber. A pressure seal is disposed over the chamber, while a yoke 40 is coupled to and extends upwardly from the top of the bonnet and supports a valve stem 42 extending along and defining the axis 28. In one embodiment, the valve stem is a rising stem, which is threadably engaged by an actuator 70, shown as a wheel.

Referring to FIGS. 1-3 and 7, a valve 50 includes a cylindrical core 52 having an outer surface 54 spaced radially inwardly from the interior surface of the circumferential wall 32. The outer surface of the core 54 and the interior surface of the circumferential wall 32 define an annular space 56 therebetween. The valve includes cylindrical lower and upper guides 58, 60 (or discs) having outer peripheral surfaces 62, 64 spaced or extending radially from the outer surface of the core. The outer peripheral surfaces of the guides may be configured with overlays, and are dimensioned to slidably engage the interior surface of the circumferential wall 32 of the chamber, including the hard facing material 33. The lower and upper guides 58, 60 are spaced apart a distance D on the core along the axis 28 and define a bottom 64 and top 62 of the annular space 56. It should be understood that the annular space 56 is a subset of, and defines a portion of, the chamber 30 when the valve is in the open position. The valve includes a valve head 66 disposed below the lower guide, with the valve head 66 having a hard facing, including for example and without limitation a Stellite® hard facing. The upper guide 60 includes a through-hole 68, or a plurality of through-holes 68, communicating between, or in fluid communication with, the annular recess 56 and an upper portion of the chamber 30 defined above the upper guide 60.

In operation, the stem 42 may be rotated by the actuator 70, causing the stem 42 and valve 50 to move upwardly away from the valve seat 24 and into the chamber 30. The valve 50 is moveable between a closed position (FIGS. 1 and 7), wherein the valve head 66 is engaged with the valve seat 24, to an open position, wherein the valve head 66 is spaced apart from the valve seat 24 (FIG. 2). As shown in FIG. 2, the pressure relief passageway 36 is in fluid communication between the annular space 56 (and chamber 30) and the flow passageway 14, 18 downstream of the valve port 22 when the valve 50 is in at least the open position. Conversely, fluid may pass through the through holes 68 to relieve pressure between the portion of the chamber 30 above the valve and the annular space 56/flow passageway 14, 18 when the valve 50 is in the closed position.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A Y-globe valve assembly comprising:
   a valve body comprising:
      an inlet portion having an inlet port,
      an outlet portion having an outlet port, wherein the inlet and outlet portions define a flow passageway between the inlet port and the outlet port, and wherein the inlet and outlet ports are aligned along a first axis,
      a valve port separating the inlet and outlet portions, the valve port comprising a valve seat, and
      a neck portion extending upwardly from one of the inlet or outlet portions along a second axis forming an acute angle with the first axis, wherein the neck portion defines:
         a chamber having an circumferential wall,
         an upper end comprising a backseat, and
         an integrated pressure relief passageway that is a groove formed in the circumferential wall and the groove configured to provide pressure relief by permitting fluid communication between a bonnet and the outlet port, wherein the groove extends in a direction towards the upper end beyond an upper surface of an upper guide; and
   a valve comprising:
      a core having an outer surface spaced radially inwardly from the circumferential wall, wherein the outer surface and the circumferential wall define an annular space therebetween,
      a lower guide and the upper guide extending radially from the core and engaging the circumferential wall of the chamber, wherein the upper and lower guides are spaced apart on the core along the second axis and define a top and bottom of the annular space, and
      a valve head disposed below the lower guide,
   wherein the valve is moveable between an open position, wherein the valve head is spaced apart from the valve seat, and a closed position, wherein the valve head is engaged with the valve seat, and wherein the integrated pressure relief passageway is in fluid communication between the annular space and the flow passageway upstream of the valve port when the valve is in at least the open position.

2. The Y-globe valve assembly of claim 1 wherein the upper guide comprises a through-hole communicating between the annular space and an upper portion of the chamber defined between the upper guide and the backseat.

3. The Y-globe valve assembly of claim 1 wherein the inlet and outlet ports are aligned coaxially.

4. The Y-globe valve assembly of claim 1 wherein the integrated pressure relief passageway comprises an elongated channel extending radially outwardly from a surface of the circumferential wall.

5. The Y-globe valve assembly of claim 4 wherein the elongated channel has a cross-sectional area of between and including 0.5 square inches and 1.0 square inches.

6. A method of using a Y-globe valve assembly comprising:
   providing a valve body comprising:
      an inlet portion having an inlet port,
      an outlet portion having an outlet port, wherein the inlet and outlet portions define a flow passageway between the inlet port and the outlet port, and wherein the inlet and outlet ports are aligned along a first axis,
      a valve port separating the inlet and outlet portions, the valve port comprising a valve seat, and
      a neck portion extending upwardly from one of the inlet or outlet portions along a second axis forming an acute angle with the first axis, wherein the neck portion defines:
         a chamber having an circumferential wall,
         an upper end comprising a backseat, and
         an integrated pressure relief passageway that is a groove formed in the circumferential wall and the groove configured to provide pressure relief by permitting fluid communication between a bonnet and the outlet port, wherein the groove extends in a direction towards the upper end beyond an upper surface of an upper guide;
   providing a valve comprising:
      a core having an outer surface spaced radially inwardly from the circumferential wall, wherein the outer surface and the circumferential wall define an annular space therebetween,
      a lower guide and the upper guide extending radially from the core and engaging the circumferential wall of the chamber, wherein the upper and lower guides are spaced apart on the core along the second axis and define a top and bottom of the annular space, and
      a valve head disposed below the lower guide;
   moving the valve between a closed position, wherein the valve head is engaged with the valve seat, and an open position, wherein the valve head is spaced apart from the valve seat; and
   passing a fluid from the annular space through the integrated pressure relief passageway and into the flow passageway downstream of the valve port when the valve is moved to the open position.

7. The method of claim 6 wherein the fluid is a gas.

8. The method of claim 6 wherein the upper guide comprises a through-hole, and further comprising passing a fluid through the through-hole as the valve is moved to the closed position.

9. The method of claim 6 further comprising passing a fluid from the inlet port to the outlet port through the valve port when the valve is moved to the open position and the inlet and outlet ports are aligned coaxially.

10. The method of claim 6 wherein the integrated pressure relief passageway comprises an elongated channel extending radially outwardly from a surface of the circumferential wall.

11. The method of claim 10 wherein the elongated channel has a cross-sectional area of between and including 0.5 square inches and 1.0 square inches.

12. A Y-globe valve body comprising:
an inlet portion having an inlet port;
an outlet portion having an outlet port, wherein the inlet and outlet portions define a flow passageway between the inlet port and the outlet port, and wherein the inlet and outlet ports are aligned along a first axis;
a valve port separating the inlet and outlet portions, the valve port comprising a valve seat; and
a neck portion extending upwardly from one of the inlet or outlet portions along a second axis forming an acute angle with the first axis, wherein the neck portion defines:
   a chamber having an circumferential wall,
   an upper end comprising a backseat, and
   an integrated pressure relief passageway that is a groove formed in the circumferential wall and the groove configured to provide pressure relief by permitting fluid communication between a bonnet and the outlet port, wherein the groove extends in a direction towards the upper end beyond an upper surface of an upper guide of a valve.

13. The Y-globe valve body of claim 12 wherein the inlet and outlet ports are aligned coaxially.

14. The Y-globe valve body of claim 12 wherein the integrated pressure relief passageway comprises an elongated channel extending radially outwardly from a surface of the circumferential wall.

15. The Y-globe valve body of claim 14 wherein the elongated channel has a cross-sectional area of between and including 0.5 square inches and 1.0 square inches.

\* \* \* \* \*